United States Patent
Prajescu et al.

(10) Patent No.: US 9,238,887 B2
(45) Date of Patent: Jan. 19, 2016

(54) DRYING METHOD AND PROFILE

(75) Inventors: Ionelia Silvia Prajescu, Santiago de Queretaro (MX); Sebastièn Beaulac, Santiago de Queretaro (MX)

(73) Assignee: MABE, S.A. DE C.V., Queretaro (MX)

( * ) Notice: Subject to any disclaimer, the term of this patent is extended or adjusted under 35 U.S.C. 154(b) by 1308 days.

(21) Appl. No.: 13/091,559

(22) Filed: Apr. 21, 2011

(65) Prior Publication Data

US 2012/0017463 A1     Jan. 26, 2012

(30) Foreign Application Priority Data

Jul. 23, 2010  (MX) .................. MX/A/2010/008116

(51) Int. Cl.
  *F26B 3/02*   (2006.01)
  *D06F 58/28*  (2006.01)
  *D06F 58/26*  (2006.01)

(52) U.S. Cl.
  CPC ............ *D06F 58/28* (2013.01); *D06F 58/26* (2013.01); *D06F 2058/289* (2013.01); *D06F 2058/2854* (2013.01)

(58) Field of Classification Search
  CPC . D06F 58/26; D06F 58/28; D06F 2058/2854; D06F 2058/289; D06F 2058/2893
  USPC .......... 219/490, 491, 492, 494; 34/549, 553
  See application file for complete search history.

(56) References Cited

U.S. PATENT DOCUMENTS

2004/0055176 A1 * 3/2004 Yang et al. ................. 34/549
2004/0060196 A1 * 4/2004 Lueckenbach ............. 34/595

FOREIGN PATENT DOCUMENTS

| EP | 0965806 | 8/1998 |
| JP | 1064700 | 3/1989 |
| JP | 3109100 | 5/1991 |
| JP | 4200500 | 7/1992 |
| JP | 7289798 | 11/1995 |
| JP | 10043498 | 2/1998 |
| JP | 10043499 | 2/1998 |

* cited by examiner

*Primary Examiner* — Jiping Lu
(74) *Attorney, Agent, or Firm* — Terry M. Sanks, Esq.; Beusse Wolter Sanks & Maire, PLLC

(57) ABSTRACT

A drying method in a dryer machine which involves sending a pulse according to a pulse pattern formed by: energizing each of a plurality of actuators of a heater for a first determined set time; de-energizing one actuator of the heater for a second determined set time; de-energizing another actuator of the heater for a third determined period of time; compare, during the previous steps, the temperature detected by a temperature detector versus a target value; in case the temperature detected is higher than the target value, interrupting a drive signal to drivers for the heater; in case the temperature detected is lower than the target value, uninterrupting the signal to the drivers; and repeat the previous steps at least one time.

4 Claims, 7 Drawing Sheets

DRYING METHOD AND PROFILE

RELATED APPLICATIONS

This application claims priority from Mexican application Serial No. MX/a/2010/008116 filed Jul. 23, 2010, which is incorporated herein by reference in its entirety.

FIELD OF INVENTION

The present invention relates to a drying method and profile in a clothes dryer. Specifically, the present invention relates to a method and profile with a drying cycle which results in an energy and/or gas savings of the dryer in comparison to that of normal cycles, by means of heat diminishing which does not help in evaporating water from the textiles.

BACKGROUND

During the last years, and in the area of household appliances, the international community has increasingly become more conscious of environmental protection. Specifically, it is required that household appliances use less water if water is used, less gas if gas is used, and less energy, which translates into less electricity. Therefore, there exists a need for household appliances to be more energy efficient. In 2008, the European Community applied to the Escobilan for a study on the impact of household appliances on the environment, including clothes dryers. In the same year, the DOE in the United States began to develop a regulatory standard for energy efficiency of clothes dryers, which shall become effective as of Jan. 1, 2015. Thus, it is imminent that household appliances, especially dryers, reduce their energy and gas use, to comply with the future standards and to be more energy efficient.

US publication number 2006086000 makes known a dryer and a method to control the same, where an alert is generated to inform the operator that the dryer is operating abnormally and even if there exists a malfunction in an electric interrupter provided to prevent overheating of a heater in the dryer when the dryer is operating abnormally, the malfunction is prevented from causing additional risk. The heater includes a dryer, an exit duct, an electric interrupter and a control. The heater is provided in order to heat the air. The hot air flows through the exit duct. The interrupter shuts off to deactivate the heater when the heater temperature is outside of a predetermined temperature range. If the interrupter shuts off a certain number of predetermined times or more during the operation of the heater, the control determines that the air flow is abnormal and deactivates the heater.

Japanese publication number 10043499 makes known that when a cycle is selected, until an exit temperature, which is detected by an exit temperature detector which is placed near the drum's air exit, reaches a high limit temperature, two out of the three heaters are turned on and the temperature is slowly raised during a period. When the exit temperature reaches the high temperature limit, only one heater is turned on and the heating is suppressed. Thus, the exit temperature is slowly lowered for a period of time. When the exit temperature is lowered by 4° C. relative to the high temperature limit, both heaters are turned on again and the temperature rises again for a period of time. By turning on part of the heaters even during the time of lowering the temperature in such a way, the range of fluctuation of the temperature is decreased and damage to the textiles is reduced.

Japanese publication number 10043498 makes known that when a substratum temperature is lesser than the reference temperature, until the exit temperature, detected by the exit temperature detector placed close to the drum's air exit, reaches the high limit temperature TH, the three heating pieces are turned on and the temperature is raised for a period of time. When the exit temperature reaches temperature TH, two heaters are on and one is shut off. Thus the exit temperature is gently lowered for a period of time. When the exit temperature is lowered by 1° C. relative to TH, the three heaters are turned on again for a period of time. When the temperature increase continues despite a heater being turned off, all the heaters are turned off when the temperature reaches 4° C. higher than the TH for a period of time. By means of such control, the temperature fluctuation range is decreased and the damage to textiles is reduced.

Japanese publication number 07289798 makes known that during the heating process a microcomputer electrifies the heaters to heat the air transmitted, giving the motor the energy to rotate the drum which rotates a fan which stirs air, and the drying operation is completed, when the temperature difference in the exit temperature detector and the surrounding temperature detector reach the predetermined value. In this instance, when the surrounding temperature is lesser than the predetermined temperature, while the exit temperature is higher than the predetermined temperature only one of the heaters is electrified. When the exit temperature is lower than the prescribed temperature, both heaters must be electrified. Additionally, when the surrounding temperature is lower than the predetermined temperature, while the surrounding temperature is higher than the upper limit, the electricity must be suppressed to both heaters.

U.S. Pat. No. 6,199,300 makes known a method and apparatus to control the heat entrance to a dryer, where the initial heat entrance to the load of clothes is placed on the highest power until a first predetermined temperature or time condition take place. Afterwards, the heat is reduced to reduce energy consumption, while moisture is effectively removed from the clothes load. When the moisture content of the clothes load falls below a predetermined quantity, the complete heat entrance is applied to remove the remaining moisture from the clothes load.

U.S. Pat. No. 5,291,667 makes known a control system for a dryer with a microprocessor which monitors the entrance air temperature and the exiting air temperature. If the entrance temperature exceeds a high value limit a predetermined number of times, an air blocking indicator is activated. The degrees of dryness are measured by the number of times that the entrance temperature has fallen below the threshold value while the heater is turned off because the exit temperature has exceeded the desired value. A drying time is calculated and displayed for the user based on a linear function and exit temperatures measured at the beginning of the cycle and again a short time afterwards.

U.S. Pat. No. 7,444,762 makes known a clothes dryer which has a system for regulating the entering air temperature. The system includes a first detector placed in the dryer's entrance and includes a timer and thermostat, a heat source found in a heating box, adjacent to the first detector and a second detector found at the dryer's exit. The thermostat measures the dryer's entering air temperature and cooperates with the control to prevent the thermostat from reaching its limit temperature and turns off the heat source. Thus, the damage due to excessive air temperatures in the dryer is avoided.

Japanese publication number 03109100 makes known a first temperature detector found in an air discharge part. The air in a drum is suctioned through the filter flow through an exit in the drum and enters the front part of the fan. Afterwards, the air flows through the duct towards a heater, where it is heated by all the heating units of the heater. Thus, the heated air is discharged towards the drum for circulation. On the other hand, the air outside of the dryer is suctioned towards the back part of the fan through an entry point formed in the dryer's back plate and discharged through an air discharger also formed in the back plate. When the first temperature detector, which is placed close to the air discharger, sends a temperature detection signal indicating a higher value than that which was predetermined, initially, the energy supply to the heating unit ceases to decrease the quantity of heat to be generated in one step.

Other documents in the area are US publication number 2003/097764, EP number 0 965 806, JP 04200500, JP 1064700, U.S. Pat. No. 4,485,566 and U.S. Pat. No. 4,267,643.

None of the documents in previous art make known a method to create a household appliance energy efficient, specifically a dryer. Specifically, previous art does not make known a cycle which offers a savings in a dryer's energy consumption, in comparison to that of traditional cycles.

Thus, a need exists for an efficient energy or gas control for drying, so that drying may be benefitted from the discovery of an efficient moisture reduction in constant cycles with less drying energy or maximum inner temperature.

BRIEF DESCRIPTION OF THE INVENTION

The present invention relates to a method, specifically a cycle to reduce the energy and/or gas consumed by a household appliance, specifically a dryer. The cycle which takes place in the present invention reduces the heat quantity which does not help in evaporating water from the textiles. The method can be divided into two distinct sub-methods or sub-cycles which take place in parallel manner.

The present invention also relates to a textile dryer which can include a cabinet or main casing, a front panel, a back panel, a pair of lateral panels spaced between them by the front and back panels and an upper cover. Within the casing, a drum or container is found mounted for rotation around a substantially horizontal axis. A motor rotates the drum in the horizontal axis by means of, for example, a pulley and a band. The drum generally has a cylindrical shape, is has a cylindrical perforated outer wall and is enclosed in its front by a wall which defines an opening in the drum. The articles of clothing and other textiles are introduced into the drum through the opening. A plurality of dumping ribs is found within the drum to raise the articles and later allow them to be dumped again to the drum's lower part while the drum rotates. The drum includes a back wall which is supported in a rotating manner within the main casing by an adequate fixed bearing. The back wall includes a plurality of holes which receive hot air which has been treated by a heating means, such as a combustion chamber and a back duct. The combustion chamber receives air at room temperature via an entrance. Dryers can be gas and/or electric, where the electric ones have heating resistance elements found in the heating chamber positioned next to the outer perforated cylindrical wall which would replace the combustion chamber and the back duct of a gas dryer. The heated air is suctioned from the drum by a fan, same which is driven by the motor. The air passes through a filter screen which traps any type of felt particles. While the air passes through the filter screen a seal duct tramp enters and it is passed outwards of the clothes dryer through an exit duct. After the articles have been dried, they are removed from the drum via the opening.

In one embodiment, a moisture detector is used to predict the percentage of moisture content or dryness level of the articles in the container. The moisture detector typically comprises a pair of spaced bars or electrodes and also comprises circuits to provide a representation of the voltage signal of the moisture content of the articles to an electric control based on the electric resistance or ohms of the articles. The moisture detector is located on the inner lower front wall of the drum and alternatively it has been mounted on the back part of drum's wall when this wall is in resting phase. The signal from the detector can be chosen to provide a continual representation of the moisture content of the articles within an adequate range to be processed by the electric control.

The electric control is also coupled with an entering temperature detector. The entering temperature detector is mounted to the dryer on the air flow entering the drum. The entering temperature detector detects the temperature which enters the drum and sends a corresponding temperature signal to the electric control. The electric control is also coupled to the exiting temperature detector which detects the air temperature exiting the drum and sends a corresponding temperature signal to the electric control. The electric control interprets these signals to generate an air flow parameter based on the entering temperature increase and/or a size of load parameter based on the exiting temperature increase. These parameters, among others, are used to select an objective moisture signal, which in turn is used by the controller in conjunction with the filtered and/or reduced noise voltage signal of the moisture detector to control the dryer's operation.

The electric control comprises an analog to digital converter (A/D) to receive the signal representations sent by the moisture detector and the temperature detectors. The signal representation of the A/D converter and a counter/timer is sent to a central processing unit (CPU) for greater processing of the signal which shall be described below in greater detail. The CPU also receives the entering and exiting temperature signals respectively of the temperature detectors via two distinct analog to digital converters (A/D). The CPU receives energy from a source of energy, comprises one or more processing modules stored in an adequate memory device, such as a reading memory uniquely ROM, to predict a moisture percentage content or degree of dryness of the textile articles in the container as a function of the electric resistance of the articles. It should be noted, that the memory device is not necessarily limited to being ROM memory, any type of memory device can be used, for example, an erasable and programmable reading memory device (EPROM) which stores instructions and facts can also work effectively. Once it has been determined that the textile articles have reached a desired dryness level, then the CPU sends respective signals to an entry/exit module which in turn sends respective signals to de-energize the motor and/or the heating means.

The CPU and the ROM can be configured to comprise a dryer processor. The processor estimates the detention time and controls the dryer's detention based on a moisture signal received from the moisture detector. The processor filters the moisture signal and compares this to the objective moisture signal to control the dryer's operation. The processor selects a target voltage signal—or objective moisture—from a table of objective moisture signals. Alternative methods to this selection can be chosen from diffused logic.

Additionally, the electric control receives a signal from a pulse generator. This pulse generator, same which can be by electric, digital, mechanic or electro mechanic means, where in a preferred embodiment a micro control is specifically preferred: in an alternative embodiment of said pulse generator, an electric motor (AC, DC, or stepped, among others) can be coupled to a motor reducer or coupled directly to the axis of at least one lever which activates at least on pair of contacts (platinum): said pulse generator is capable of sending a signal of ignition or turn off to the CPU. The CPU processor based on the temperature signal received by the entrance and/or exit temperature detectors, as well as based on the signal received from the counter and/or timer is capable of sending a signal to the driver of each one of the actuators of the heating means in order to energize or de-energize each one of said actuators of said means of heating. The drivers can be any type of electric interrupters, such as can be a thyristor, IGBT, TRIAC (Triad for Alternative Current), a relay or any other type of electric interrupters known in the art, which control, in part, the energizing or ignition of the drivers for the heating means. Conversely, it is understood, that the concept of "actuators" encompasses any type of device or element which generates heat by any means, as can be: a gas burner coupled to a solenoid valve or similar, an electric resistance, a means of infrared, laser etc., as well as any combinations of the same; and that the heating means comprise at least one actuator.

In a first embodiment, the heating means of a dryer are composed of two actuators with at least one driver per actuator, and a drying method, during the dryer's first cycle comprised of: determining if within the control panel's options, the operator selected a drying cycle of the present invention, if this is so, they are modified, by means of the electric control, the temperature thresholds of the heating means to low heat. Having modified the thresholds, the drying cycle begins sending a pulse to the drivers by means of the electric control, according to a pulse pattern received from the pulse generator, where said pulse pattern comprises of: energizing all the actuators by at least one heating means for a first determined time interval which varies between approximately 10 seconds to 3 minutes, generating the maximum possible heat. Once this first determined time interval has lapsed, de-energizing the first actuator of at least one heating means for a second determined time interval which varies between 10 seconds to 4 minutes; once the second determined time interval has lapsed, de-energizing the second actuator of at least one heating means for a third determined time interval which varies between approximately 30 seconds to 4 minutes. In parallel manner, and during the previous steps of the pulse pattern, entrance and/or exit temperature to the drum is constantly monitored, such that the temperature detected by a first temperature detector is compared to a target temperature: in case where said detected temperature is greater than the target temperature, the CPU interrupts the signal to the drivers, and in case the detected temperature is lower than the target temperature, the CPU does not interrupt the signal to the drivers allowing said drivers to energize and activate the actuators with the described pulse pattern, and in this way, the previously described steps are repeated, from the initial drying, at least one time or until the drying is concluded. Once drying has concluded, a cooling time is allowed and the cycle ends. In an alternative embodiment to the presently described, during the cycle described above in view of different function conditions such as: the type, quantity, quality of the textiles, the restrictions in the air exit means etc., and the temperature measured by the drum's entry and/or exit temperature detectors is higher than that of the target values', the CPU interrupts the signal or previously described pulse train to a first actuator of the heating means, by means of the corresponding driver, to turn it off and lower the heat within the dryer's drum. If after a determined time interval which varies between 500 milliseconds and one minute, the temperature is still greater than the value of the lower threshold previously established, the CPU interrupts the signal or pulse train previously described to a second actuator of the heating means via its driver to also turn it off and lower with greater velocity the heat within the dryer's drum, and in its case, this is successively repeated until all heating means are turned off. The dryer still keeps functioning without generating heat until the temperature within the drum measured by means of the temperature detector, is lower than the target value, when the temperature is lower than the target value, the CPU allows the signal or pulse train of the pulse generator to pass again towards the drivers of the heating means, energizing these according to the turn or position on the time pulse profile which the pulse generator is emitting in that instant; so that based on the referred signal, the CPU determines which drivers of the actuators of the heating means are energized; so that the previous steps are repeated, from the beginning of the drying, at least one time or until drying is concluded. Once drying is concluded, a cooling time is allowed and the cycle is complete.

In a second embodiment, a dryer's heating means are composed of a number of actuators "n" with at least one driver per actuator, which in an illustrative and not limitative manner can comprise a pair of burners each coupled to a solenoid valve or burner coupled to a valve which can adopt a multitude of positions which requires various solenoids to be controlled, an arrangement with a multitude of resistances which can be controlled separately, an infrared bank where each heater or "bulb" is independently controlled, or any other similar arrangement: in this way the drying method, during a dryer's first cycle comprises: determining if within the options of the control panel, the operator selected the drying cycle of the present invention, if this is so, by means of the electric control, the temperature thresholds of the heating means are modified to a lower heating. Having modified the thresholds, the first drying cycle is started sending a pulse to the drivers by means of the electric control according to a pulse pattern received from the pulse generator, where said pulse pattern comprises of: energizing all the actuators "n" of at least one type of heating for a determined interval of time which varies between approximately 10 seconds to 3 minutes, generating the maximum possible heat. Once said determined time interval has lapsed, de-energize a first actuator of at least one heating means, so that only a number of actuators "n−1" remains energized of said at least one heating means for a determined time interval which varies between 10 seconds to 4 minutes: said determined time interval having lapsed, repeat the previous step immediately the number of necessary times in order to consecutively de-energize the actuators one by one of at least one means of heating until the number of energized actuators is "n=0". Once the last actuator of at least one heating means is de-energized a determined time interval is allowed to lapse which varies between approximately 30 seconds to 4 minutes. In parallel manner, and during the previous steps of the pulse pattern, entrance and/or exit temperature to the drum is constantly monitored, such that the temperature detected by a first temperature detector is compared to a target temperature: in case that said detected temperature is greater than the target temperature, the CPU interrupts the signal to the drivers, and in case the detected temperature is lower than the target temperature, the CPU does not interrupt the signal to the drivers, allowing said drivers to energize and activate the actuators with the described pulse pattern, and in this way, the previously described steps are repeated, from the initial drying, at least one time or until the drying is concluded. Once drying has concluded, a cooling time is allowed and the cycle ends. In an alternative embodiment to the presently described, if during the cycle described above in view of different function conditions such as: the type, quantity, quality of the textiles, the restrictions in the air exit means etc., and the temperature measured by the drum's entry and/or exit temperature detectors is higher than that of the target values', the CPU interrupts the signal to a first actuator of the heating means (n−1), by means of the corresponding driver, to turn it off and lower the heat within the dryer's drum; if after a determined time interval which varies between 500 milliseconds and one minute, the temperature is still greater than the value of the lower threshold previously established, the CPU interrupts the signal to a second actuator of the heating means (n−2) to also turn it off and lower with greater velocity the heat within the dryer's drum, and in its case (as long as the temperature measured by the entry and/or exit temperature detector is till greater than the target temperature), this step is successively repeated as many times as necessary until the point that the CPU interrupts the signal consecutively one by one to all the actuators of the heating means (n=0). The dryer keeps functioning without generating heat until the temperature within the drum measured by means of the temperature detector, is lower than the lower threshold value previously established. When the temperature is lower than said lower threshold value previously established, the CPU allows the pulse train of the pulse generator to pass again towards the driver and the actuators of the heating means, energizing these according to the turn or position on the time pulse profile which the pulse generator is emitting in that instant; so that based on the referred signal, the electric control determines which drivers of the actuators of the heating means are energized; so that the previous steps are repeated, from the beginning of the drying, at least one time or until drying is concluded. Once drying is concluded, a cooling time is allowed and the cycle is complete.

In a third embodiment, a dryer's heating means are composed of at least one actuator with at least one driver per at least one actuator, and the drying method, during the first cycle of the dryer comprises: determining if within the options of the control panel, the operator selected the drying cycle of the present invention, if this is so, by means of the electric control, the temperature thresholds of the heating means are modified to a lower heating. Having modified the thresholds, the first drying cycle is started sending a pulse to the drivers by means of the electric control according to a pulse pattern received from the pulse generator, where said pulse pattern comprises of: energizing at least one actuator of at least one type of heating to its maximum power for a determined interval of time which varies between approximately 50 to 80 seconds, generating the maximum possible heat. Once said determined time interval has lapsed, de-energize at least one actuator of at least one heating means, for a determined time interval which varies between 30 seconds to 4 minutes. In parallel manner, and during the previous steps of the pulse pattern, entrance and/or exit temperature to the drum is constantly monitored, such that the temperature detected by a first temperature detector is compared to a target temperature: in case that said detected entry and/or exit temperature of the drum is greater than the target temperature, the CPU interrupts the signal to at least one driver, and in case the detected temperature is lower than the referred to target temperature, the CPU does not interrupt the signal to at least one driver, allowing said at least one driver to energize and activate at least one actuator with the described pulse pattern, and in this way, the previously described steps are repeated, from the initial drying, at least one time or until the drying is concluded. Once drying has concluded, a cooling time is allowed and the cycle ends.

Thus, the objective of the present invention is to provide a versatile drying cycle for a dryer, which allows energy savings during the drying cycle, and depending on the conditions of and within the dryer, allow for variation of the drying cycle.

Another objective of the present invention is to provide a dryer which can carry out a versatile drying cycle, which saves energy during the drying cycle, allowing for variations, depending on the conditions of and within the dryer, to the drying cycle.

DETAILED DESCRIPTION OF THE INVENTION

The present invention relates to a method, specifically a cycle to lower the energy and/or gas consumed by a household appliance, specifically clothes dryer. The method to take place within the present invention reduces the amount of heat, translated into energy consumed, which does not help in the evaporating of water from the textiles. The method can be divided into two distinct sub-methods or sub-cycles which take place in parallel form.

DEFINITIONS

The use of the term "approximately" provides an additional range of determined time. The term is defined in the following way. The additional range of time provided by the term is that of approximately ±10%. As an example, but not in limitative manner, if it states "approximately between 30 to 40 seconds", the exact range is between 27 and 44 seconds, or can be between 33 and 44 seconds, or can be between 27 and 36 seconds or between 33 and 36 seconds. Any of the possibilities previously described is covered by the term "approximately".

The term "Restriction" refers to the possible restrictions found at the exit of the moist air which emanate from the inner drum towards the exterior. Among the possible restrictions is the diameter size of the exit duct, the length of the exit duct, accessories to the exit duct (elbows, reductions, valves, flow meters, inter alia), obstructions etc.

The term "Crude Voltage" refers to voltage without any type of signal conditioning or digital signal processing, but the simple voltage acquisition which is being measured.

The term "Filtered Voltage" refers to a voltage with signal conditioning and/or digital signal processing.

The term "temperature or target value" refers to a temperature measured by the temperature detectors such as thermocouples or any other temperature measuring device, which can be placed in the air flow entrance or exit or from the drum sending a signal to the CPU: the mentioned temperature range depends to a great extent on the design and construction of the clothes dryer; so that its range in illustrative but not limitative form varies between 38° C. and 150° C., preferably between 5° C. and 25° C. above the temperature threshold.

The term "temperature thresholds" refers to the temperature range or band for the dryer's proper operation, measured by the temperature detectors such as the thermocouples or any other device used to measure temperature, which can be placed in the air flow entrance or exit or from the drum, sending a signal to the CPU: the mentioned temperature range depends to a great extent on the design and construction of the clothes dryer; so that its range in illustrative but not limitative form varies between 37.77° C. and 65.55° C. (100° F. to 150° F.).

Figure 1:
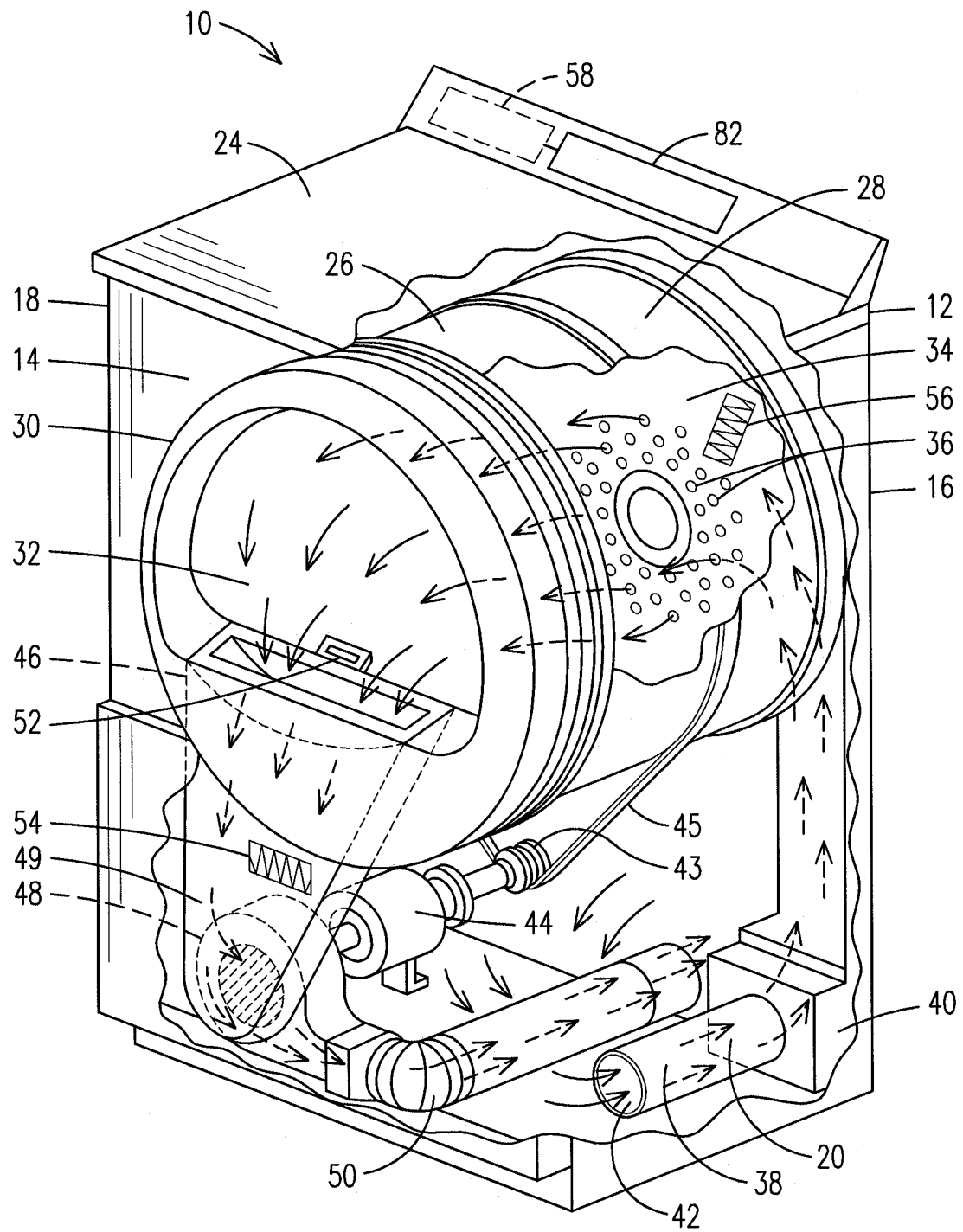
FIG. 1 shows a view in perspective of the textile dryer.

FIG. 1 shows a view in perspective of a clothes dryer 10 which can benefit from the present invention. The dryer can include a cabinet or main casing 12, a front panel 14, a back panel 16, a pair of side panels 18, 20 spaced between them by the front and back panels and an upper cover 24. Within the main casing 12 is a drum or container 26 mounted for rotation around a substantially horizontal axis. A motor 44 rotates the drum on the horizontal axis by means of, for example, a pulley 43 and a band 45. The drum generally has a cylindrical shape; it has an outer perforated cylindrical wall 28 and is enclosed on its front by a wall 30 which defines an opening 32 in the drum 26. Textiles articles, such as clothes, are introduced into the drum 26 through the opening 32. A plurality of dumping ribs (not shown) is found within the drum to raise the articles and later allow them to be dumped again to the drum's lower part while the drum rotates. The drum 26 includes a back wall 34 which is supported in a rotating manner within the main casing 12 by an adequately fixed bearing. The back wall 34 includes a plurality of holes 36 which receive hot air which has been treated by a heating means, such as a combustion chamber 38 and a back duct 40. The combustion chamber 38 receives air at room temperature via an entrance 42. Even though the sample dryer 10 shown in FIG. 1 is a gas one, the option of an electric dryer should also be considered, which has heating resistance elements located in the heating chamber placed next to the outer perforated cylindrical wall 28 which would replace the combustion chamber 38 and the back duct 40 of a gas dryer. The heated air is suctioned from the drum 26 by a fan 48, same which is driven by the motor 44. The air passes through a filter screen 46 which traps any type of felt particles. While the air passes through the filter screen 46, a seal duct tramp 47 enters and it is passed to the outside of the clothes dryer through an exit duct 50. After the articles have been dried, they are removed from the drum 26 via the opening 32.

In an exemplary embodiment of this invention, a moisture detector 52 is used to predict the percentage of moisture content or dryness level of the articles in the container. The moisture detector 52 typically comprises a pair of spaced bars or electrodes and also comprises circuits to provide a representation of the voltage signal of the moisture content of the articles to an electric control 58 based on the electric resistance or ohms of the articles. The moisture detector 52 is located on the inner front wall of the filter screen 46 which is exposed to the drum's 26 mouth and alternatively they have been mounted on the back part of drum's wall when this wall is in resting phase. In some instances, the moisture detector has been used in a baffle contained in the dryer's drum. As an example, and not as a limitation, the signal from the detector can be chosen to provide a continual representation of the moisture content of the articles within an adequate range to be processed by the electric control 58. It should be appreciated that the indicating signal of the moisture content does not need to be a voltage signal, being that, for example, through the use of a voltage which is controlled by an oscillator, the signal of moisture indicator could have been chosen as a frequency signal which varies proportionally with the moisture content of the articles in view of a signal whose voltage level varies proportionally with the moisture content of the articles.

While the textiles are dumped within the dryer's drum 26, they contact the spaced electrodes of the stationary moisture detector 52 randomly. Thus the textiles are intermittently in contact with the detector's electrodes. The length of time of contact between the textiles and the detector's electrodes depends on various factors, such as the rotational velocity of the drum, the type of textile, the quantity or volume of clothes in the drum and the air flow through the drum. When the wet textiles are in the dryer's drum and in contact with the detector's electrodes, the resistance through the detector is low. When the textiles are dry and contact the detector's electrodes, the resistance through the detector is high and indicative of a dry load. However, situations can exist which can result in erroneous indications of the actual dryness level of the articles. For example, in a situation when the wet textiles are not in contact with the detectors, like for example in the case of a small load, the resistance through the detector is very high (open circuit), which would be falsely indicative of a dry load. Additionally if a conductive portion of dry textiles, like for example a button or a metal zipper contacts the detector's electrodes, the resistance of the detector would be low, which would be falsely indicative of a wet load. Thus, when the textiles are wet there can be times when the detector can erroneously detect a dry condition (high resistance) and, when the textiles are dry, there can be times when the detector erroneously detects a wet condition (low resistance).

Figure 2:
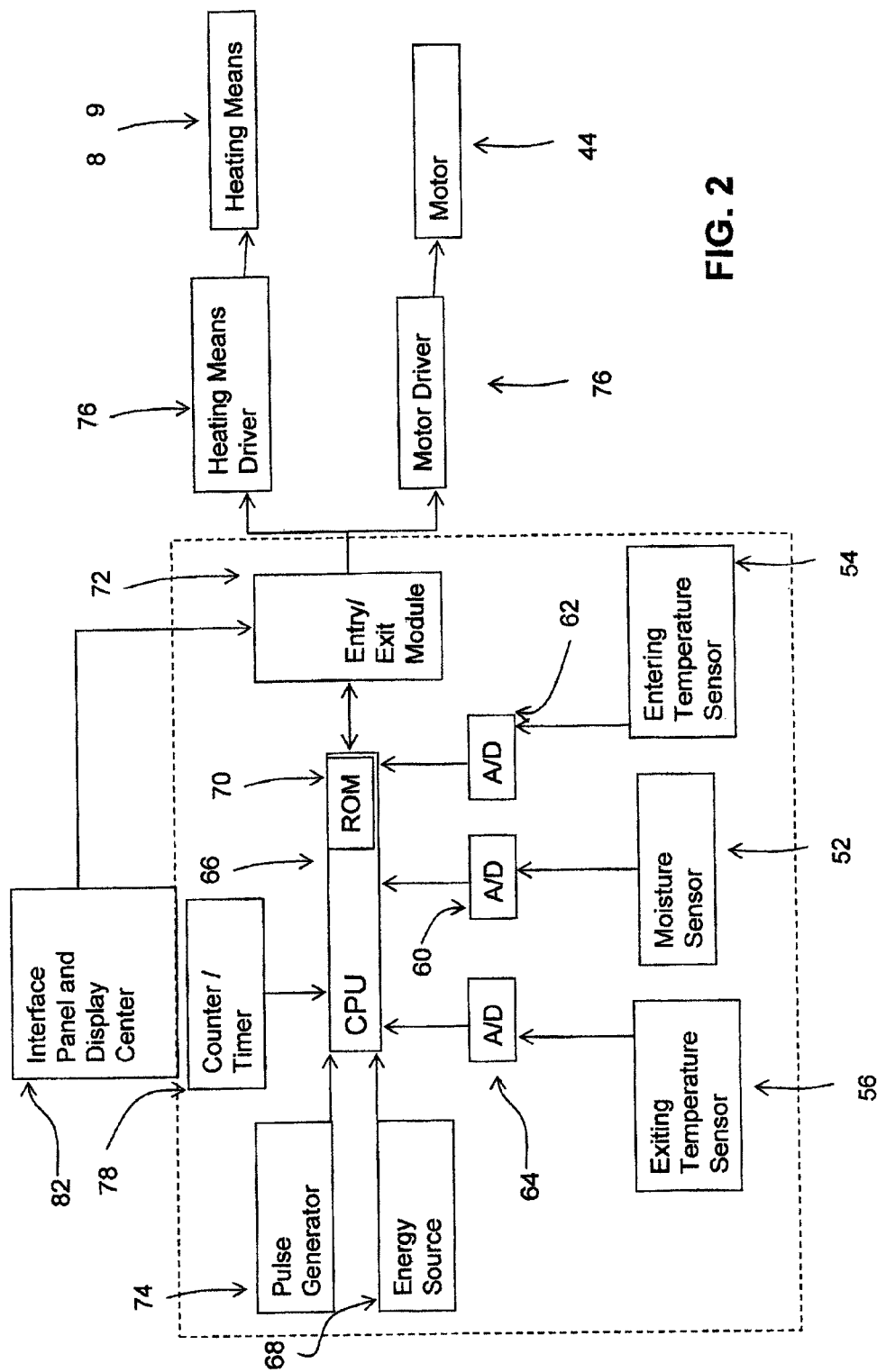
FIG. 2 shows a block diagram of a control system which can be adopted by the present invention.

Such as is shown in FIG. 2, the electric control 58 is also coupled with an entering temperature detector 56, such as, for example, a thermostat. The entering temperature detector 56 is mounted to the dryer 10 on the air flow entering the drum 26. The entering temperature detector 56 detects the temperature which enters the drum 26 and sends a corresponding temperature signal 58 to the electric control. The electric control is also coupled to the exiting temperature detector 54 which detects the air temperature exiting the drum 26 and sends a corresponding temperature signal to the electric control 58. The electric control is coupled to the exit temperature detector 54 which detects the exiting air temperature of the drum 26 and sends a corresponding temperature signal to the electric control 58. The electric control 58 interprets these signals to generate an air flow parameter based on the entering temperature increase and/or a size of load parameter based on the exiting temperature increase. These parameters are used to select an objective moisture signal, which in turn is used by the electric controller 58 in conjunction with the filtered and/or reduced noise voltage signal of the moisture conductor 52 to control the dryer's 10 operation.

The electric control 58 comprises an analog to digital converter (A/D) 60 to receive the signal representations sent by the moisture detector 52 and the temperature detectors 56, 54. The signal representation of the A/D converter 60 and a counter/timer 78 is sent to a central processing unit (CPU) 66 for greater processing of the signal which shall be described below in greater detail. The CPU 66 also receives the entering and exiting temperature signals respectively of the temperature detectors 56 and 54 respectively, via two distinct analog to digital converters (A/D) 62 and 64. The CPU 66 receives energy from a source of energy 68, comprises one or more processing modules stored in an adequate memory device, such as a reading only memory ROM 70, to predict a moisture percentage content or degree of dryness of the textile articles in the container as a function of the electric resistance of the articles, as well as to process elapsed time and add an additional time. It is appreciated that the memory device is not necessarily limited to ROM memory; any type of memory device can be used, such as for example, an erasable programmable reading memory (EPROM) which stores instructions and data would also work effectively. Once it has been determined that the textile articles have reached a desired dryness level, then the CPU sends respective signals to an entry/exit module 72 which in turn sends respective signals to de-energize the motor and/or the actuators of the heating means. While the drying cycle shuts down, the control can activate a whistle via an enabling/disabling whistle circuit to indicate the end of the cycle to the operator. An electronic inter phase and display panel 82 allow the user to program the dryer's operation and additionally allows for monitoring the respective cycle's progress of a dryer's operation.

The CPU 66 and the ROM 70 can comprise a dryer processor. The processor estimates the detention time and controls the dryer's 10 detentions based on a moisture signal received from the moisture detector 52. The processor filters the moisture signal and compares this to the objective moisture signal to control the dryer's operation 10. There exist many common methods and systems to filter the moisture signal. For more detailed information on the filtering of this signal, one can refer to Canadian Patent Application number 2,345,631 published on Nov. 2, 2001. According with the present invention, the processor can select a signal for target moisture based on a table of target moisture. Alternative methods to this selection can be chosen with diffused logic.

Additionally, the electric control receives a signal from a pulse generator 74. This pulse generator, same which can be by electric, digital, mechanic or electro mechanic means, where in a preferred embodiment a micro control is specifically preferred: in an alternative embodiment of said pulse generator, an electric motor (AC, DC, or stepped, among others) can be coupled to a motor reducer or coupled directly to the axis of at least one lever which activates at least on pair of contacts (platinum): said pulse generator 74 is capable of sending a signal of ignition or turn off (pulse train) to the CPU 70. The CPU processor 70 based on the temperature signal received by the entrance and/or exit temperature detectors 56, 54, as well as based on the signal received from the counter and/or timer 78 is capable of sending a signal to the driver 76 of each one of the actuators of the heating means 8, 9 in order to energize or de-energize each one of said actuators 8, 9 of said means of heating. The drivers can be any type of electric interrupters, such as can be a thyristor, IGBT, TRIAC (Triad for Alternative Current), a relay or any other type of electric interrupters known in the art, which control, in part, the energizing or ignition of the drivers for the heating means 8, 9. Conversely, it is understood, that the concept of "actuators" encompasses any type of device or element which generates heat by any means, as can be: a gas burner coupled to a solenoid valve or similar, an electric resistance, a means of infrared, laser etc., as well as any combinations of the same; and that the heating means 8, 9 comprise at least one actuator.

Thus, the objective of the present invention is a drying cycle which reduces the energy and/or gas consumed by a dryer. The drying cycle, which can be seen as two distinct cycles 90, 120 take place in parallel form.

During the first drying cycle 90 the operator selects a drying cycle to be used from the control panel 82. If within the options selected by the operator, the drying cycle, object of the present invention is selected 91 the thresholds 92 are modified, by means of the electric control 58, to low heat, said low temperature thresholds varying between approximately between 37.77° C. and 65.55° C. (100° F. to 150° F.). Having modified the thresholds 92, the drying cycle begins 93. In an alternative embodiment, the cycle determines if it is a gas or electric based dryer, or a combination of the two. If it is determined that it is a gas or a combination of gas, the type of gas dryer is determined in order to open a valve or gas actuator and ignite the gas, or rather, ignite the gas and energize the electric resistance(s). If it is determined that it is not a gas dryer, the electric resistance(s) is (are) energized. Alternatively, these steps can be pre-programmed and stored in the CPU 66 memory allowing for the type of dryer determining steps to be skipped. All the heating means 96 are turned on 8, 9 granting the maximum gas flow through the valve or actuator so that the gas can be ignited to generate the maximum heat possible and/or activate, by means of an actuator, the resistors, in such a way that all electric resistors are ignited at their maximum level.

Figure 3:
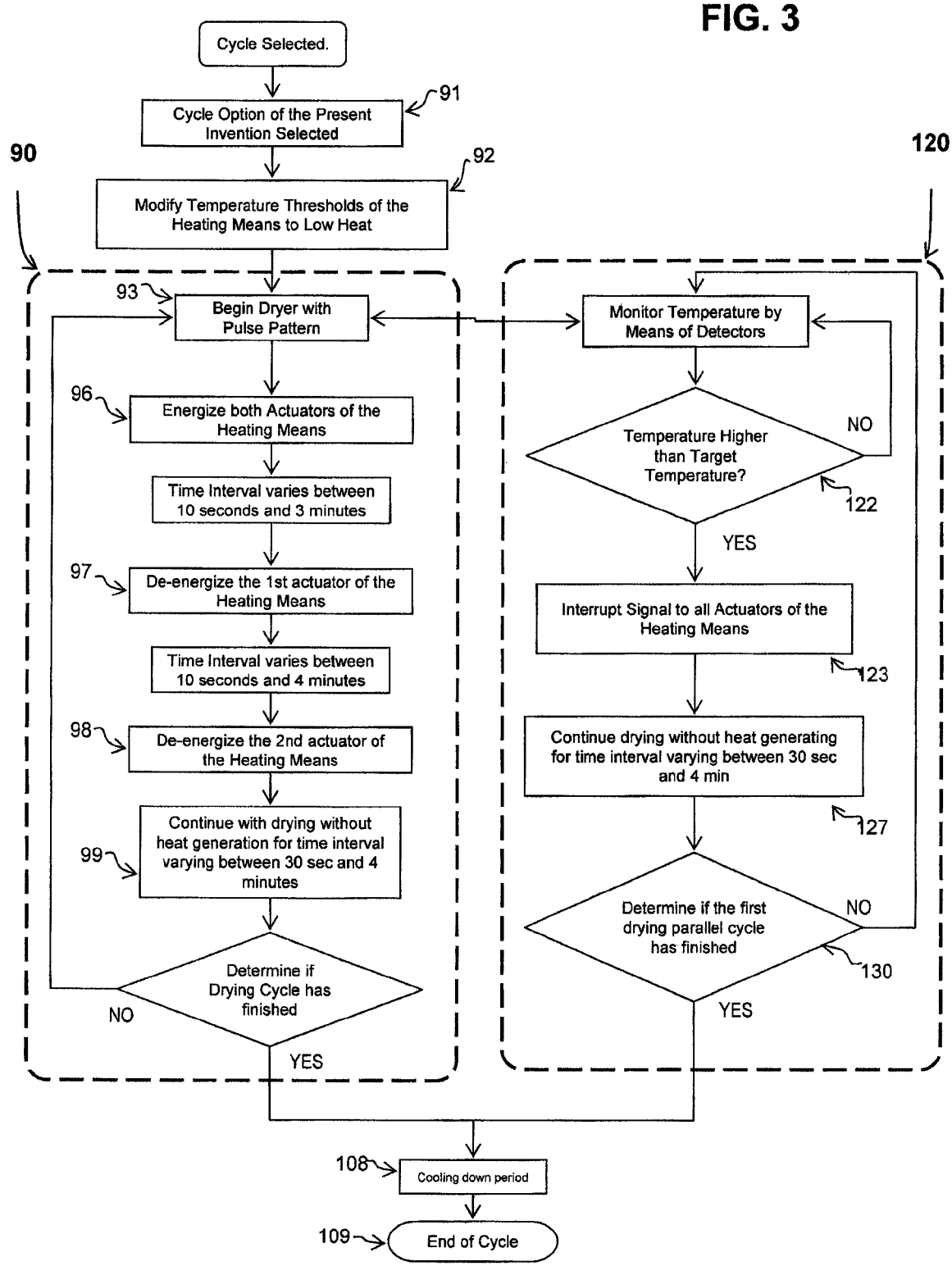
FIG. 3 shows a flow diagram of the drying cycle according to the preferred first embodiment of the present invention.
Figure 3A:
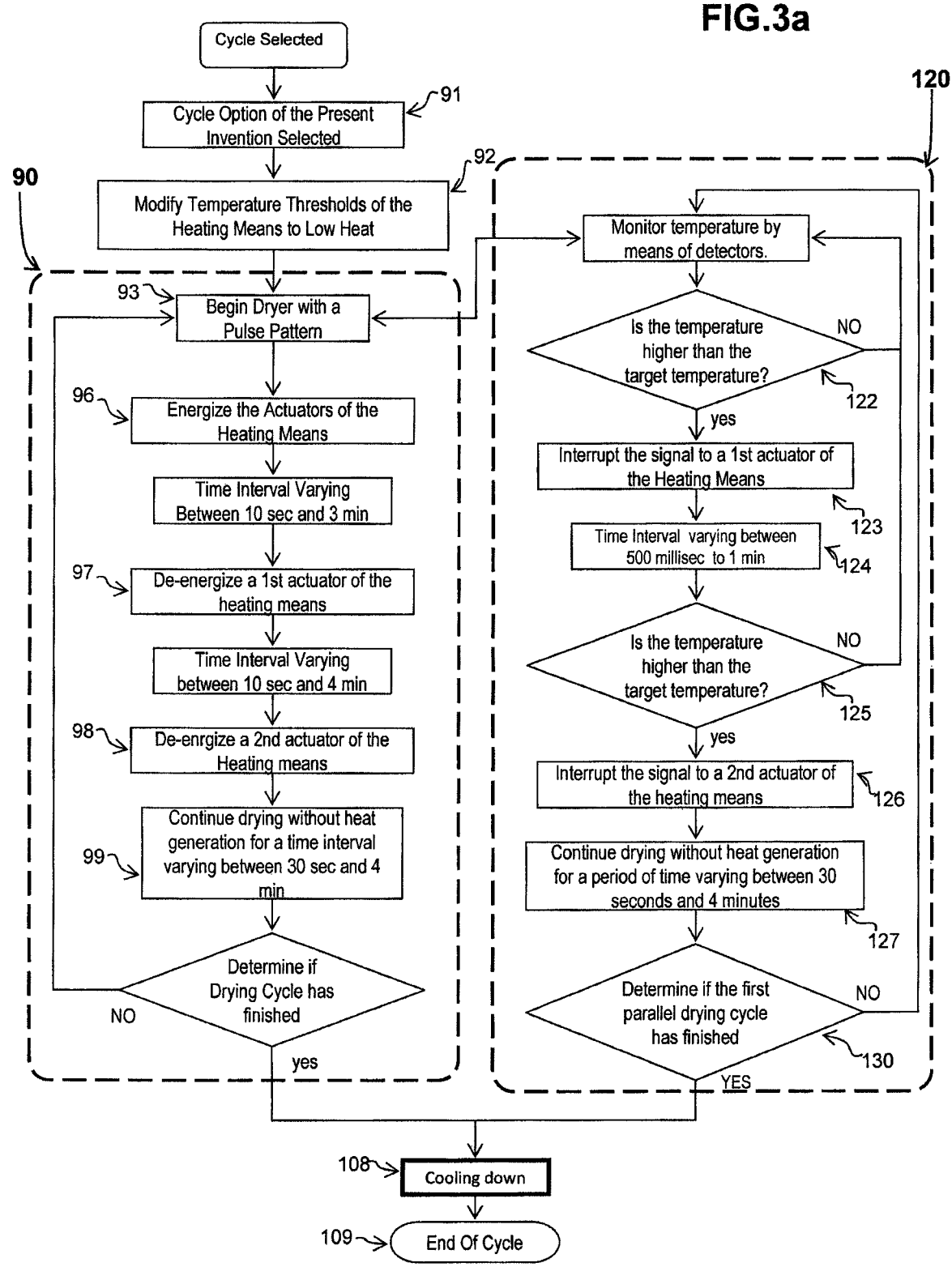
FIG. 3a is a flow diagram of the drying cycle according to an alternative first embodiment of the invention.

FIG. 3 shows a flow diagram of the drying cycle according to the preferred first embodiment of the present invention. In this first preferred embodiment, the dryer's heating means 8, 9 are composed of two actuators with at least one driver 76 per actuator, and a drying method, during the dryer's first cycle 90 comprised of determining if within the control panel's 82 options, the operator selected 91 the drying cycle of the present invention, if this is so, they are modified 92, by means of the electric control 58, the temperature thresholds of the heating means to low heat. Having modified the thresholds, the drying cycle begins 93 sending a pulse to the drivers 76 by means of the electric control's 58 CPU 70, according to a pulse pattern received from the pulse generator 74, where said pulse pattern comprises of: energizing 96 all the actuators by at least one heating means 8,9 for a first determined time interval which varies between approximately 10 seconds to 3 minutes, generating the maximum possible heat. Once this first determined time interval has lapsed, de-energizing 97 the first actuator of at least one heating means 8, 9 for a second determined time interval which varies between 10 seconds to 4 minutes; once the second determined time interval has lapsed, de-energizing 98, 99 the second actuator of at least one heating means 8,9 for a third determined time interval which varies between approximately 30 seconds to 4 minutes. In parallel manner, and during the previous steps of the pulse pattern, entrance and/or exit temperature to the drum is constantly monitored 105, such that the temperature detected by a first temperature detector is compared 106 to a target temperature: in case where said detected temperature is greater than the target temperature, the CPU 70 interrupts the signal to the drivers 76, and in case the detected temperature is lower than the target temperature, the CPU 70 does not interrupt the signal to the drivers allowing said drivers 76 to energize and activate the actuators with the described pulse pattern, and in this way, the previously described steps are repeated, from the initial drying 93, at least one time or until the drying is concluded 107. Once drying has concluded, a cooling time 108 is allowed and the cycle ends 109. In an alternative embodiment to the presently described, which is shown in FIG. 3a, during the cycle 90 described above in view of different function conditions such as: the type, quantity, quality of the textiles, the restrictions in the air exit means etc., and the temperature measured by the drum's entry and/or exit temperature detectors 122 is higher than that of the target values', the CPU 70 interrupts the signal of the electronic control 58 to a first actuator of the heating means 8,9, by means of the corresponding driver 76, to turn it off 123 and lower the heat within the dryer's drum. If after a determined time interval 124 which varies between 500 milliseconds and one minute, the temperature is still greater 125 than the value of the lower threshold previously established, the CPU 70 interrupts the signal or pulse train emanating from the pulse generator 74 of the electric control 58 to the driver of a second actuator of the heating means 8,9 to also turn it off 126 and lower with greater velocity the heat within the dryer's drum, and in its case, repeating this successively until all heating means 8,9 are turned off. The dryer still keeps functioning 127 without generating heat until the temperature within the drum measured by means of the temperature detector, is lower than the target value, when the temperature is lower than the target value, the CPU 70 allows the signal or pulse train of the pulse generator to pass again towards the drivers of the actuators of the heating means, energizing these 130 according to the turn or position on the time pulse profile which the pulse generator is emitting in that instant; so that based on the referred signal, the CPU 70 of the electric control 58 determines 131 which actuators of the heating means are energized; so that the previous steps are repeated, from the beginning of the drying, at least one time or until drying is concluded. Once drying is concluded, a cooling time is allowed and the cycle is complete.

Figure 4:
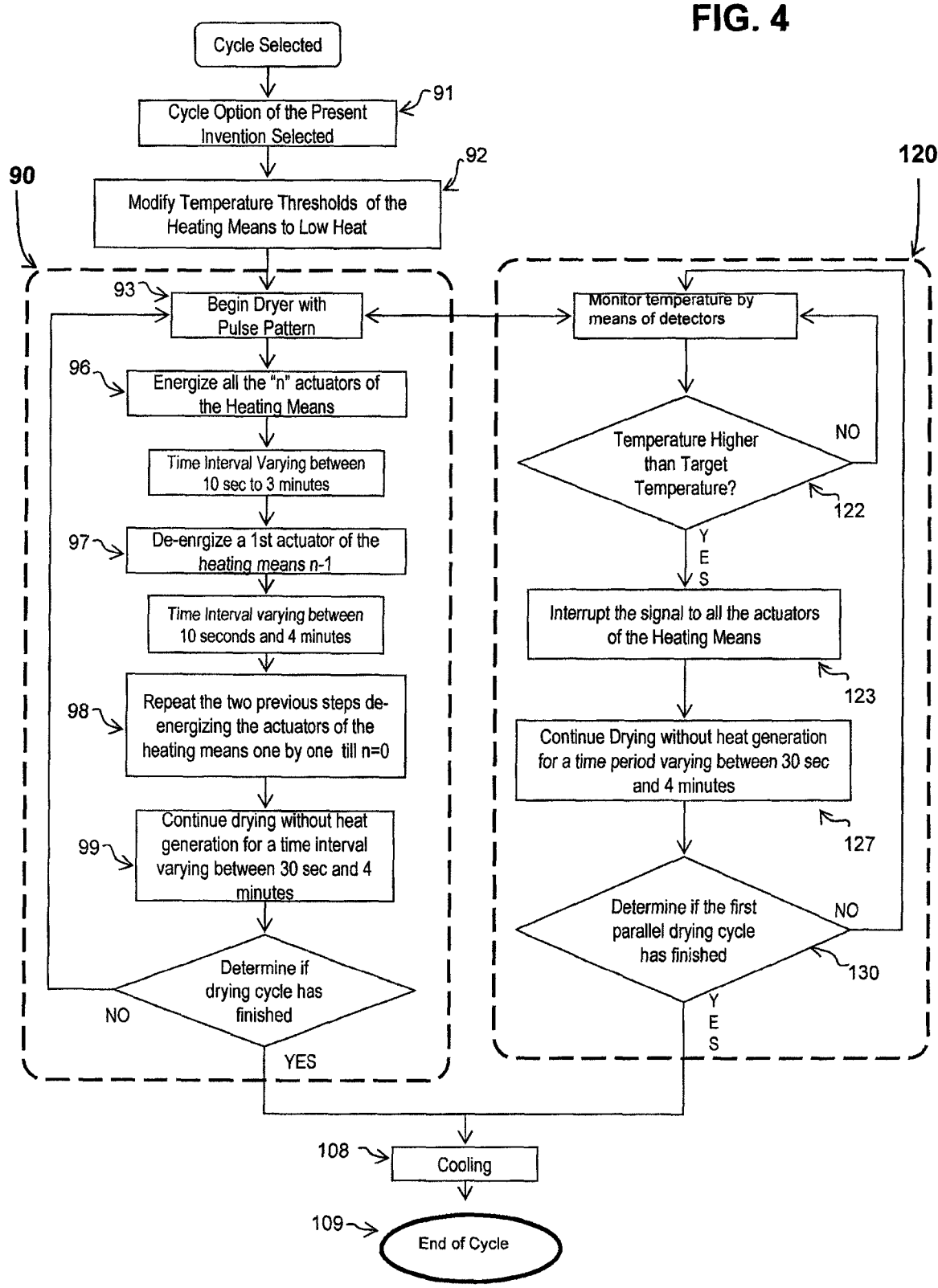
FIG. 4 shows a flow diagram of the drying cycle according to the preferred second embodiment of the invention.
Figure 4A:
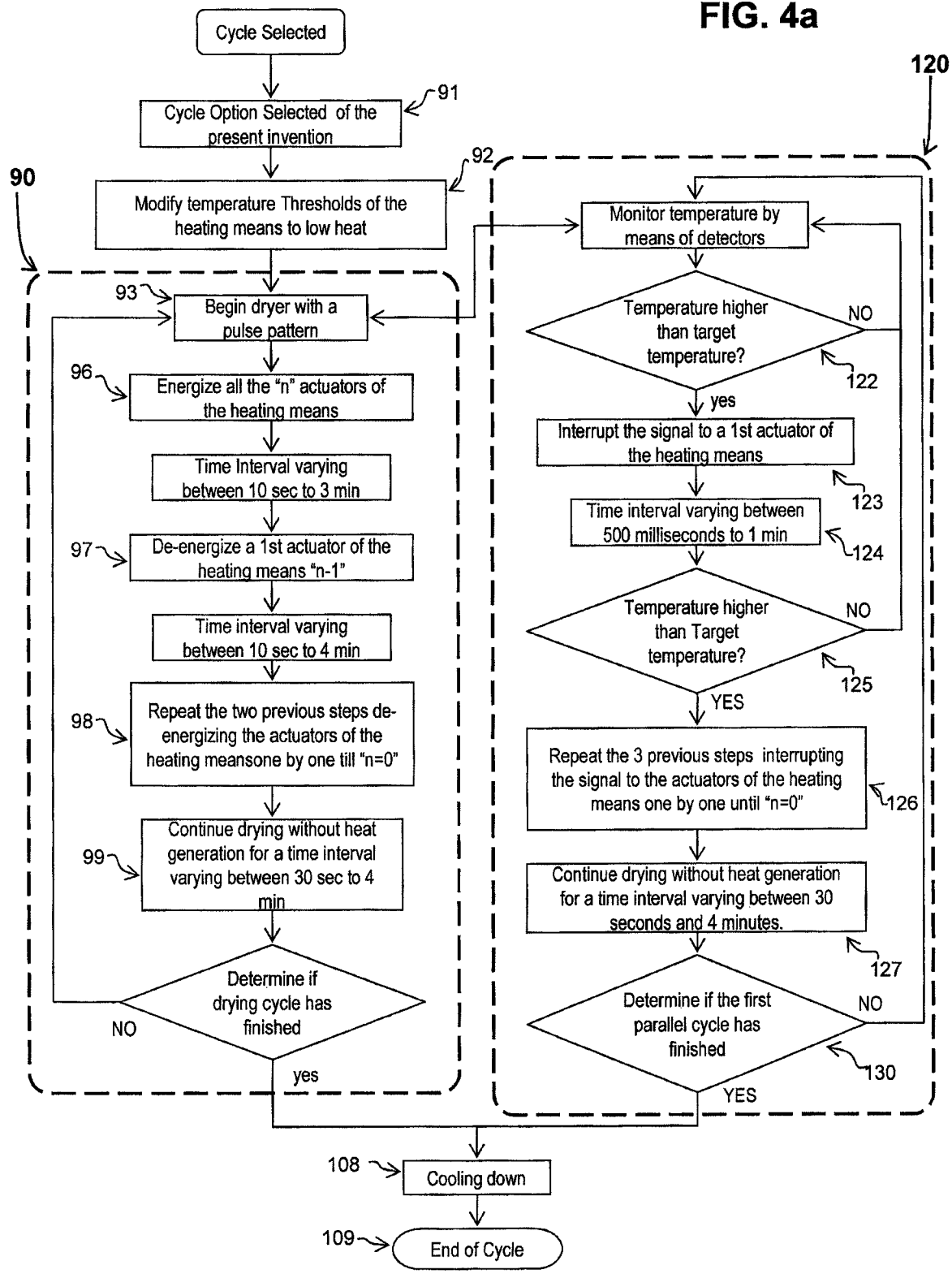
FIG. 4a is a flow diagram of the drying cycle according to an alternative embodiment of the invention.

FIG. 4 shows a flow diagram of the drying cycle of a preferred second embodiment of the invention. In this second preferred embodiment, the dryer's heating means 8,9 are composed of a number of actuators "n" with at least one driver 76 per actuator, which in an illustrative and not limitative manner can comprise a pair of burners each coupled to a solenoid valve or burner coupled to a valve which can adopt a multitude of positions which requires various solenoids to be controlled, or any other similar arrangement: in this way the drying method, during a dryer's first cycle 90 comprises: determining if within the options of the control panel 82, the operator selected 91 the drying cycle of the present invention, if this is so, by means of the electric control, the temperature thresholds of the heating means are modified 92 to a lower heating. Having modified the thresholds, the first drying cycle is started sending a pulse to the drivers 76 by means of the electric control's 58 CPU 70 according to a pulse pattern received from the pulse generator 74, where said pulse pattern comprises of: energizing 96 all the actuators "n" of at least one type of heating means 8, 9 for a determined interval of time which varies between approximately 10 seconds to 3 minutes, generating the maximum possible heat. Once said determined time interval has lapsed, de-energize 97 a first actuator of at least one heating means 8,9, so that only a number of actuators "n−1" remains energized of said at least one heating means for a determined time interval which varies between 10 seconds to 4 minutes: said determined time interval having lapsed, repeat the previous step 97 immediately the number of necessary times in order to consecutively de-energize all the actuators one by one of at least one means of heating 8,9 until the number of energized actuators 98 is "n=0". Once the last actuator of at least one heating means 8, 9 is de-energized a determined time interval 99 is allowed to lapse which varies between approximately 30 seconds to 4 minutes. In parallel manner, and during the previous steps of the pulse pattern, entrance and/or exit temperature to the drum is constantly monitored 105, such that the temperature detected by a first temperature detector is compared 106 to a target temperature: in case that said detected temperature is greater than the target temperature, the CPU 70 interrupts the signal to the drivers 76, and in case the detected temperature is lower than the target temperature, the CPU 70 does not interrupt the signal to the drivers 76, allowing said drivers 76 to energize and activate the actuators with the described pulse pattern, and in this way, the previously described steps are repeated, from the initial drying 93, at least one time or until the drying is concluded 107. Once drying has concluded, a cooling time 108 is allowed and the cycle ends 109. In an alternative embodiment to the presently described, shown in FIG. 4a, which is describes as follows: if during the cycle 90 described above in view of different function conditions such as: the type, quantity, quality of the textiles, the restrictions in the air exit means etc., and the temperature measured by the drum's entry and/or exit temperature detectors is higher 122 than that of the target values', the CPU 70 interrupts the signal of the electric control 58 to driver of a first actuator of the heating means (n−1), by means of the corresponding driver 76, to turn it off 123 and lower the heat within the dryer's drum; if after a determined time interval 124 which varies between approximately 500 milliseconds and one minute, the temperature is still greater 125 than the target temperature, the CPU 70 interrupts the signal of the electric control 58 to a second actuator of the heating means (n−2) to also turn it off 126 and lower with greater velocity the heat within the dryer's drum, and in its case this step 126 is successively repeated as many times as necessary until the point that the CPU 70 interrupts the signal consecutively one by one to all the drivers and their respective actuators of the heating means (n=0). The dryer keeps functioning 127 without generating heat until the temperature within the drum, measured by means of the temperature detector, is lower than the objective temperature. When the temperature is lower than the target temperature, the CPU 70 allows the pulse train of the pulse generator 74 to pass again towards the driver and the actuators of the heating means, energizing these 130 according to the turn or position on the time pulse profile which the pulse generator is emitting in that instant; so that based on the referred signal, the CPU 70 of the electric control 58 determines 131 which of the actuators of the heating means 8,9 are energized; so that the previous steps are repeated, from the beginning of the drying, at least one time or until drying is concluded. Once drying is concluded, a cooling time is allowed and the cycle is complete.

Figure 5:
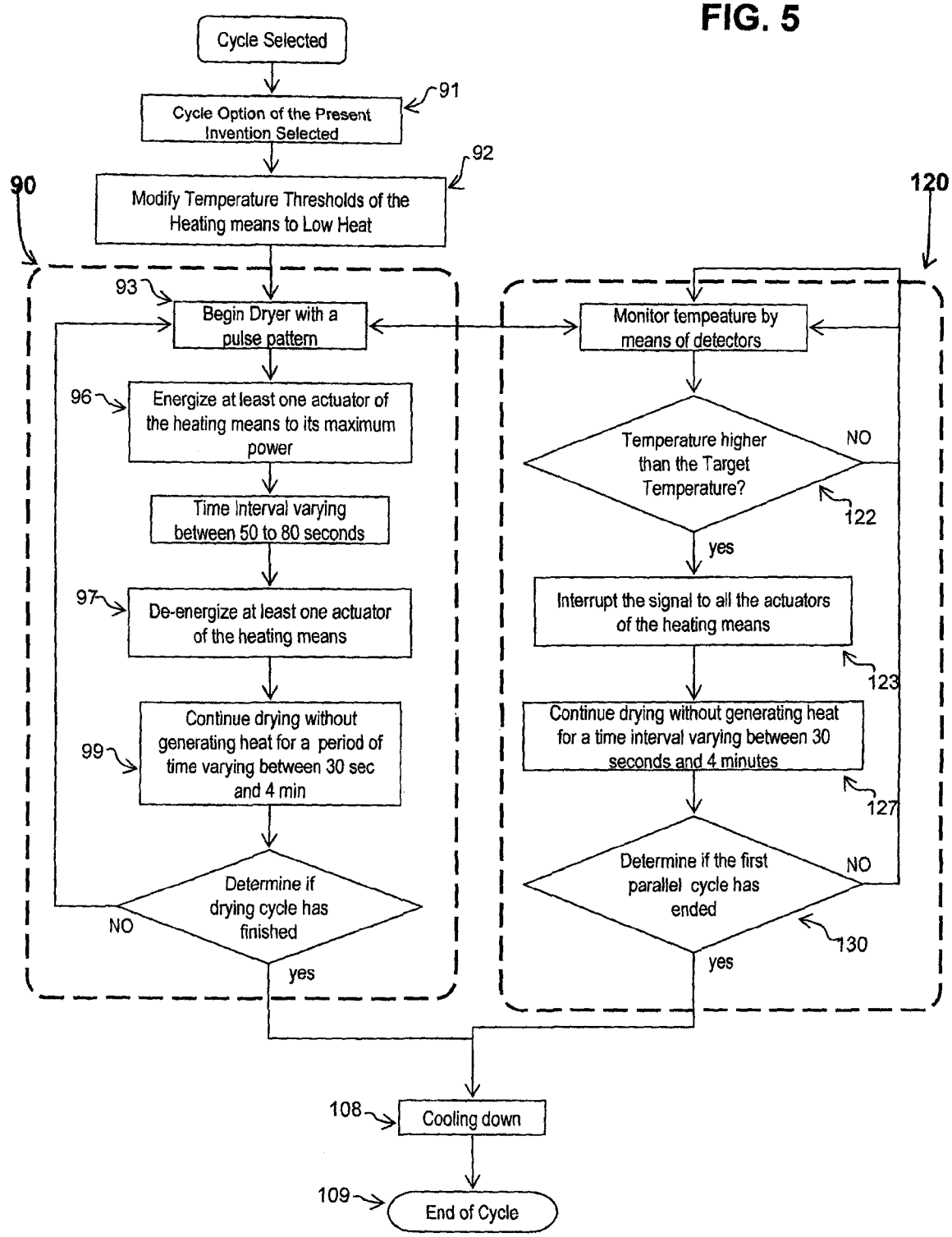
FIG. 5 is a flow diagram of the drying cycle according to a third preferred embodiment of the invention.

FIG. 5 shows a flow diagram of the drying cycle of a third embodiment of the invention. In this third embodiment, a dryer's heating means 8, 9 are composed of at least one actuator with at least one driver 76 per at least one actuator, and the drying method, during the first cycle 90 of the dryer comprises: determining 91 if within the options of the control panel 82, the operator selected the drying cycle of the present invention, if this is so, by means of the electric control 58, the temperature thresholds of the heating means are modified 92 to a low heating. Having modified the thresholds, the first drying cycle 93 is started sending a pulse to the drivers 76 by means of the electric control's 58 CPU 70, according to a pulse pattern received from the pulse generator 74, where said pulse pattern comprises: energizing 96 at least one actuator of at least one type of heating means 8, 9 to its maximum power for a determined interval of time which varies between approximately 50 to 80 seconds, generating the maximum possible heat. Once said determined time interval has lapsed, de-energize 98, 99 at least one actuator of at least one heating means 8, 9, for a determined time interval which varies between 30 seconds to 4 minutes. In parallel manner, and during the previous steps of the pulse pattern, entrance and/or exit temperature to the drum is constantly monitored 105, such that the temperature detected by a first temperature detector is compared 106 to a target temperature: in case that said detected entry and/or exit temperature of the drum is greater than the target temperature, the CPU 70 interrupts the signal to at least one driver 76, and in case the detected temperature is lower than the referred to target temperature, the CPU 70 does not interrupt the signal to at least one driver 76, allowing said at least one driver 76 to energize and activate at least one actuator with the described pulse pattern, and in this way, the previously described steps are repeated, from the initial drying 93, at least one time or until the drying is concluded 107. Once drying has concluded, a cooling time is allowed and the cycle ends 109.

The energy use during the two parallel drying cycles 90,120 depends on the state of elements, mainly of the heating means 8, 9 during the drying cycle. Similarly, it highly depends on the moisture level and the load of clothes in the drum 26. The damper the textiles, the greater the time shall be for the textiles to reach a dryness level of the load, and the longer the heating means and air drying 8, 9 shall be turned on. The energy consumption of a dryer in the US is measured by the DOE procedure which establishes a calculation to measure a Factor Energy (FE) of a minimum standard of 1.363 Kg/kWh (3.01 lb/kWh) in electric dryers and a minimum of 1.209 Kg/kWh (2.67 lb/kWh) for gas dryers.

In the first embodiment of the present invention, it is calculated that the total time of the dryer's 10 operation, both means of heating 8, 9 are turned on approximately from 5 to 80% of the total operational time. It is calculated that the total operational time for the dryer 10, one of the two heating means 8, 9 is turned on approximately 10 to 80% of the total operational time of the dryer. Finally, it is calculated that of the total operational time for the dryer 10, both heating means 8, 9 are turned off approximately between 10 and 85% of the total operational time. The energy use savings attained by the cycles 90, 120 mentioned above, especially in light of the first cycle 90 is between 10 to 20% of the DOE standard, with a 95% level of confidence using the DOE procedure, which represents an energy savings which varies between 90 to 160 kWh/per year.

In a third embodiment of the present invention, it is calculated that the total time of the dryer's 10 operation, the means of heating 8, 9 is turned on approximately from 30 to 50% of the total operational time. It is calculated that of the total operational time for the dryer 10, the heating means 8, 9 is turned off approximately between 20 to 80% of the total operational time of the dryer. The energy use savings attained by the cycles 90, 120 mentioned above, especially in light of the first cycle 90 is between 10 to 15% of the DOE standard, with a 95% level of confidence using the DOE procedure, which represents an energy savings which varies between 90 to 127 kWh/per year.

Alterations to the structure described in the present, may be foreseen by those experts in the field. However, it must be understood that the present description is related with the preferred embodiments of the invention, which is solely for illustrative purposes and should not be construed as a limitation of the invention. All the modifications which do not depart from the spirit of the invention are included within the body of the attached claims.

The invention claimed is:

1. A drying method in a dryer machine comprising a drum, at least one electric control, one pulse generator, at least one temperature detector, one interface for the operator and at least one heater with a plurality of actuators, at least one driver per actuator, comprising sending a pulse to the drivers from the electric control, according to a pulse pattern received from the pulse generator, where a generating of the pulse pattern comprises:
   a. energizing each of the plurality of actuators of said at least one heater for a first determined set time;
   b. de-energizing one actuator of aid at least one heater for a second determined set time;
   c. de-energizing another actuator of said at least one heater for a third determined set time;
   d. concurrently with the foregoing steps, comparing an air temperature entering or exiting the drum detected by a first temperature detector relative to a target value varying between approximately 5° C. to 25° C. above a temperature threshold that varies between 37.77° C. to 65.55° C.;
   e. when the detected temperature is higher than the target value, interrupting a drive signal to the drivers;
   f. when the detected temperature is lower than the target value, uninterrupting the drive signal to the drivers; and
   g. repeating steps (a) through (d) at least one time.

2. The method according to claim 1, prior to energizing each of the plurality of actuators further comprising determining if an energy savings setting was selected on the operator interface, and, if the energy savings setting was selected, modifying a temperature threshold of said at least one heater to a lower threshold varying between approximately 37.77° C. to 65.55° C. by means of the control.

3. The method according to claim 1, further comprising selecting the pulse generator from the group consisting of a microcontroller, an electro-mechanic generator and a digital pulse generator.

4. The method according to claim 1, where the first determined set of time varies in a range from 10 seconds to 3 minutes, where the second determined set of time varies in a range from 10 seconds to 4 minutes and where the third determined set of time varies in a range from 30 seconds and 4 minutes.

* * * * *